United States Patent Office 3,328,416
Patented June 27, 1967

3,328,416
CERTAIN 2-(SUBSTITUTED HYDRAZINO)-2-
THIAZOLINES
Max Wilhelm, Allschwil, and Kurt Eichenberger, Basel,
Switzerland, assignors to Ciba Corporation, New York,
N.Y., a corporation of Delaware
No Drawing. Filed May 12, 1965, Ser. No. 455,314
Claims priority, application Switzerland, May 29, 1964,
7,048/64
15 Claims. (Cl. 260—306.7)

The present invention relates to new hydrazine derivatives. Especially it concerns 2-($N^2$—R'—$N^2$—R"—$N^1$—R'''-hydrazino-2-thiazolines in which R' represents an aryl radical and R" an alkyl radical or an unsubstituted or substituted aralkyl radical and R''' hydrogen or a lower alkyl radical, and their salts.

The aryl radical R' is above all an at most dinuclear aryl radical, for example a naphthyl or phenyl radical. These radicals may be substituted, advantageously by lower alkyl groups, lower alkoxy groups, halogen atoms or trifluoromethyl groups.

R" is above all a lower alkyl radical, or in the second place an aralkyl radical, such as a phenyl-lower alkyl group whose aryl radical may be substituted, for example, by lower alkyl groups, lower alkoxy groups, halogen atoms or trifluoromethyl groups.

Lower alkyl radicals are, for example methyl, ethyl, propyl or isopropyl radicals; straight or branched butyl, pentyl or hexyl radicals which may be bound in any desired position.

Lower alkoxy groups are more especially methoxy, ethoxy, propoxy, isopropoxy or butoxy groups.

Particularly suitable halogen atoms are fluorine, chlorine or bromine atoms.

The new compounds may also be substituted at the cyclic carbon atoms of the thiazoline ring by lower alkyl radicals.

The new compounds possess valuable pharmacological properties, more especially a vaso-constrictory and hypertensive effect. Thus, for instance in the animal test, for example in rabbits, cats and dogs, they raise on oral or intravenous administration the blood pressure of these animals. They are suitable for use as hypertensives and when administered topically as vasoconstrictors and as medicaments capable of making the swelling of the mucous membrances recede. Furthermore, the new compounds cause piloerection and may be put to relevant uses. The new compounds are also valuable intermediates for the manufacture of other useful substances.

Particularly valuable are the compound of the formula

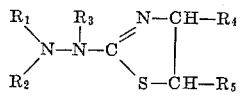

where $R_1$ represents a phenyl radical which may be unsubstituted or substituted, for instance as indicated above; $R_2$ represents a lower alkyl radical and $R_3$, $R_4$ and $R_5$ each represents a lower alkyl radical or above all hydrogen, and especially 2-($N^2$-phenyl-$N^2$-methylhydrazino)-2-thiazoline.

The new compounds are manufactured by known methods; for example, a thiosemicarbazide of the formula

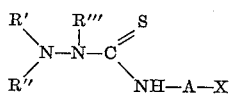

or, if desired, a tautomer thereof, in which A represents a possibly lower alkylated ethylene group; X a halogen atom, such as a chlorine atom, and R', R" and R''' have the above meanings is subjected to intramolecular condensation.

The intramolecular condensation (cyclization) is performed in the usual manner, preferably by heating, advantageously in the presence of a solvent and in the presence or absence of a condensing agent, under atmospheric or superatmospheric pressure, and if desired in an inert gas. It is of advantage to use a basic condensing agent.

The new compounds may also be manufactured by reacting a 2-thiazoline that contains in position 2 a lower alkylmercapto group, with a hydrazine of the formula

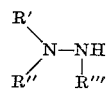

in which R', R" and R''' have the meaning given above. The reactants may be used in the form of salts thereof.

The reaction is carried out in the usual manner, in the presence or absence of a solvent and/or condensing agent, under atmospheric or superatmospheric pressure, and, if desired, in an inert gas.

Depending on the reaction conditions and starting materials used the final products are obtained in the free form or in the form of their salts which are likewise included in the present invention. A resulting free base can be converted in the usual manner into a salt thereof by reaction with an organic or inorganic acid, especially one that is suitable for the formation of therapeutically acceptable salts. On the other hand a resulting salt can be converted into the free compound in the usual manner, for example by treatment with a basic agent or an ion exchange resin. Acids capable of forming therapeutically acceptable salts are, for example, the hydrohalic acids, sulfuric acids, phosphoric acids, nitric, perchloric acid; aliphatic, aromatic or heterocyclic carboxylic or sulfonic acids, such as formic, acetic, propionic, succinic, glycollic, lactic, malic, tartaric, citric, ascorbic maleic, hydroxymaleic, or pyruvic acid; phenylacetic, benzoic, para-aminobenzoic, anthranilic, para-hydroxybenzoic, salicylic, para-aminosalicylic or embonic acid; methanesulfonic, ethanesulfonic, hydroxyethanesulfonic, ethylene sulfonic, halobenzenesulfonic, toluenesulfonic, naphthalenesulfonic acids or sulfanilic acid; methionine, tryptophan, lysine or arginine.

These and other salts of the new compounds, for example their picrates, may also be used for purifying the bases obtained, by converting the latter into a salt, isolating the salt and liberating the base from it. In view of the close relationship between the new compounds in the free form and in the form of their salts, what has been said above and below with reference to the free compounds applied also to the corresponding salts wherever this is applicable and advantageous.

The invention includes also any modification of the process in which an intermediate obtainable at any stage of the process is used as starting material and any remaining step or steps is/are carried out, or in which the starting materials are used in the form of their salts or are formed under the reaction conditions.

Thus, for example, a possibly lower alkylated β—X-ethylthiocyanate (where X has the above meaning) may be reacted with a hydrazine of the formula

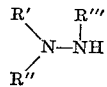

in which R', R" and R''' have the meanings given above, to form as intermediate a 1-R'-1-R"-2-R'''-thiosemicarbazide that contains in position 4 a possibly lower alkylated β—X-ethyl radical, which then further reacts as described to yield the desired final product.

The aforementioned reaction is carried out in the usual manner, in the presence or absence of diluents, condensing agents and/or catalysts, at room temperature or with cooling or heating, under atmospheric or superatmospheric pressure, and/or in an inert gas.

It is of advantage to use starting materials that produce the final products described above as being particularly valuable.

The starting materials are know or, insofar as they are new, they can be prepared by known methods.

The new compounds may be used for example in the form of pharmaceutical preparations containing them in the free form or in the form of their therapeutically useful salts in conjunction or admixture with a suitable organic or inorganic, solid or liquid pharmaceutical excipient suitable for enteral, parenteral or local administration. Suitable excipients are substances that do not react with the new compounds, for example, water, gelatin, lactose, starches, magnesium stearate, talcum, vegetable oils, benzyl alcohols, gums, polyalkyleneglycols, white petroleum jelly, or other known medicinal excipients. The pharmaceutical preparations may be, for example, tablets, dragees, ointments or creams, or in liquid form solutions, suspensions or emulsions. They may be sterilized and/or may contain assistants such as preserving, stabilizing, wetting or emulsifying agents, salts for regulating the osmotic pressure or buffers. They may also contain other therapeutically valuable substances.

The following examples illustrate the invention.

*Example 1*

A solution of 10.0 g. of $N^1$-methyl-$N^1$-phenylhydrazine in 50 cc. of ethanol is mixed with 11.0 g. of β-chlorethyl isothiocyanate; the whole is heated for 3 hours at 60° C., and then evaporated under vacuum. The residue is dissolved in 100 cc. of 2N-hydrochloric acid and extracted with ether. The hydrochloric acid layer is separated, alkalinized with sodium hydroxide solution and then extracted with ether. After drying and evaporating the ether a crystalline residue is obtained which is recrystallized from ethanol+petroleum ether, to yield crystalline 2-($N^2$-phenyl-$N^2$-methylhydrazino)-2-thiazoline of the formula

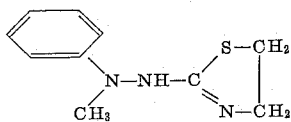

melting at 108° C. to 110° C. Its hydrochloride melts at 173° C. to 174° C.

*Example 2*

30.0 g. of 2-methylmercapto-thiazoline-hydroiodide and 12.5 g. of $N^1$-methyl-$N^1$-phenyl-hydrazine are added to a solution of 2.3 g. of sodium in 200 ml. of ethanol, and the whole then boiled for 4 hours. The batch is evaporated under reduced pressure, the residue dissolved in 250 ml. of 2N-hydrochloric acid, and the solution extracted with ether. The hydrochloric acid layer is separated, rendered alkaline by the addition of sodium hydroxide solution, and extracted with ether. On drying and evaporation of the ether, there remains the 2-($N^2$-phenyl-$N^2$-methyl-hydrazino)-2-thiazoline of the formula

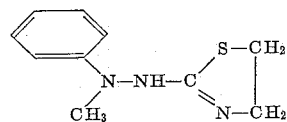

which after being recrystallized from a mixture of ethanol and petroluem ether melts at 108 to 110° C.

*Example 3*

A solution containing 2-($N^2$-phenyl-$N^2$-methylhydrazino)-2-thiazoline-hydrochloride can be prepared so as to have,( for example, the following composition:

0.10 g. of 2-($N^2$-phenyl-$N^2$-methylhydrazino)-2-thiazoline-hydrochloride,
0.28 g. of primary sodium phosphate,
0.30 g. of secondary sodium phosphate,
0.70 g. of sodium chloride,
0.01 g. of benzalkonium chloride,
Water to make up 100 ml.

*Example 4*

In an analogous manner to that described in Example 1 or 2, there may be prepared 2-($N^2$-p-ethoxyphenyl-$N^2$-p-bromobenzyl-hydrazino)-4,4-dimethyl-2-thiazoline and 2-($N^2$-m-fluorophenyl-$N^2$-p-methoxyphenethyl-$N^1$-methyl-hydrazino)-4,5-dimethyl-2-thiazoline.

What is claimed is:

1. A member selected from the group consisting of a compound of the formula

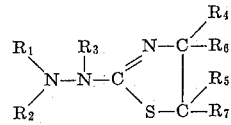

in which $R_1$ stands for a member selected from the group consisting of naphthyl, (lower alkyl)-naphthyl, (lower alkoxy)-naphthyl, (halogeno)-naphthyl, (trifluoromethyl)-naphthyl, phenyl, (lower-alkyl)-phenyl, (lower alkoxy)-phenyl, (halogen)-phenyl and (trifluoromethyl)-phenyl, $R_2$ for a member selected from the group consisting of lower alkyl, phenyl-lower alkyl, (lower alkyl)-phenyl-lower alkyl, (lower alkoxy)-phenyl-lower alkyl, (halogeno)-phenyl-lower alkyl and (trifluoromethyl)-phenyl-lower alkyl, $R_3$, $R_4$, $R_5$, $R_6$ and $R_7$ each stands for a member selected from the group consisting of hydrogen and lower alkyl, and their acid addition salts.

2. A compound of the formula

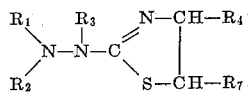

in which $R_1$ stands for a member selected from the group consisting of phenyl, (lower alkyl)-phenyl, (lower alkoxy)-phenyl, (halogeno)-phenyl and (trifluoromethyl)-phenyl, $R_2$ stands for lower alkyl and $R_3$, $R_4$ and $R_7$ each stands for a member selected from the group consisting of hydrogen and lower alkyl.

3. An acid addition salt of a compound claimed in claim 2.

4. A compound of the formula

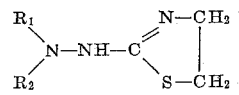

in which $R_1$ stands for phenyl and $R_2$ for lower alkyl.

5. An acid addition salt of a compound claimed in claim 4.

6. A compound of the formula

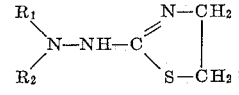

in which $R_1$ stands for (lower alkyl)-phenyl and $R_2$ for lower alkyl.

7. An acid addition salt of a compound claimed in claim 6.

8. A compound of the formula

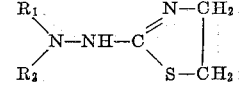

in which $R_1$ stands for (lower alkoxy)-phenyl and $R_2$ for lower alkyl.

9. An acid addition salt of a compound claimed in claim 3.

10. A compound of the formula

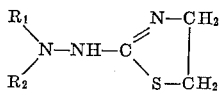

in which $R_1$ stands for (halogeno)-phenyl and $R_2$ for lower alkyl.

11. An acid addition salt of a compound claimed in claim 10.

12. A compound of the formula

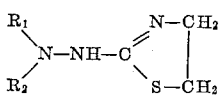

in which $R_1$ stands for (trifluoromethyl)-phenyl and $R_2$ for lower alkyl.

13. An acid addition salt of a compound claimed in claim 12.

14. 2-($N^2$-phenyl-$N^2$-methylhydrazino)-2-thiazoline.

15. An acid addition salt of the compound claimed in claim 14.

References Cited
UNITED STATES PATENTS
3,105,849 10/1963 Huebner _____ 260—569
3,213,138 10/1965 Biel _____ 260—569

OTHER REFERENCES
Beilstein, Handbuch der Organischen Chemie, vol. 27, (Berlin, 1937), pp. 148 and 452.

Beilstein, Handbuch der Organischen Chemie, vol. 27, second supplement, (Berlin, 1955), pp. 194 and 495.

ALEX MAZEL, *Primary Examiner.*

NICHOLAS RIZZO, *Examiner.*

ALTON D. ROLLINS, *Assistant Examiner.*